J. B. REPLOGLE.
SPEED LIMITING DEVICE.
APPLICATION FILED DEC. 16, 1918.

1,366,263.

Patented Jan. 18, 1921.
2 SHEETS—SHEET 1.

J. B. REPLOGLE.
SPEED LIMITING DEVICE.
APPLICATION FILED DEC. 16, 1918.
1,366,263.
Patented Jan. 18, 1921.
2 SHEETS—SHEET 2.
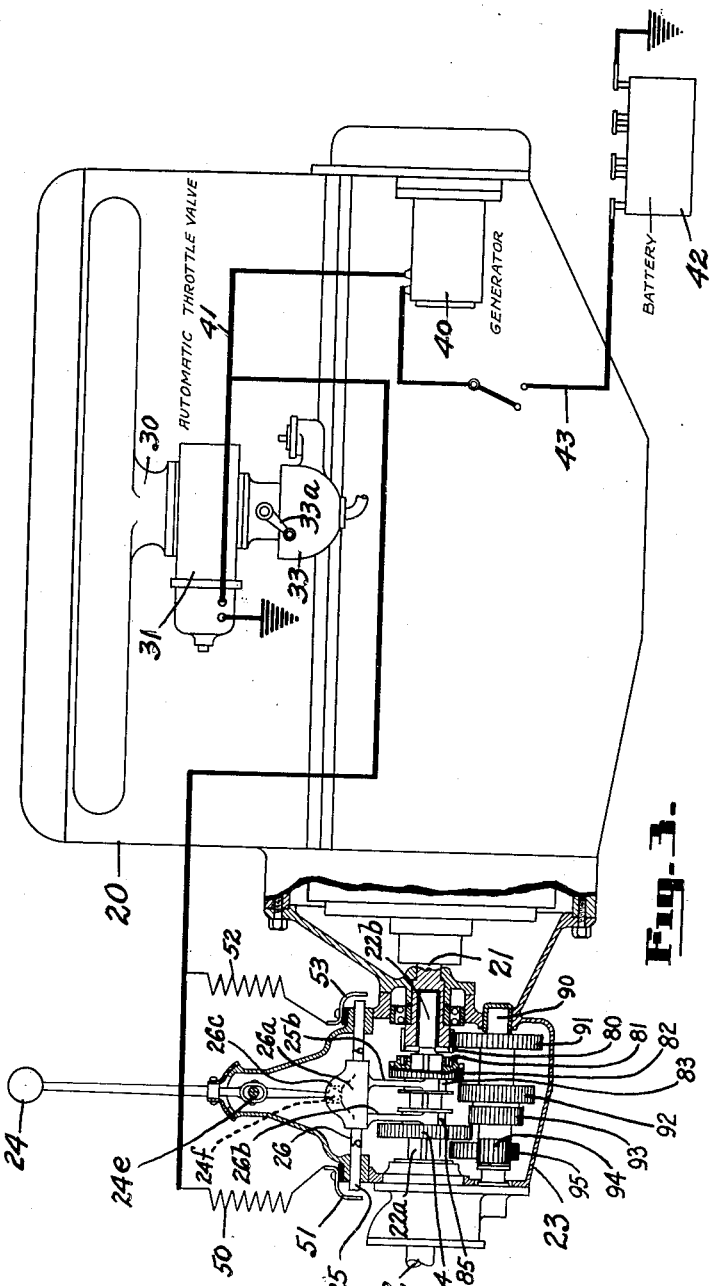
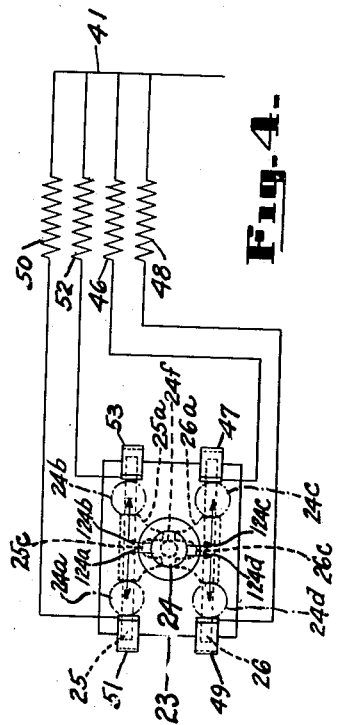
Witnesses
Walter W Riedel
Joseph N. McDonald
Inventor
James B. Replogle
Kerr, Page, Cooper and Hayward
Attorneys

UNITED STATES PATENT OFFICE.

JAMES B. REPLOGLE, OF DETROIT, MICHIGAN, ASSIGNOR TO THE REMY ELECTRIC COMPANY, A CORPORATION OF INDIANA.

SPEED-LIMITING DEVICE.

1,366,263.  Specification of Letters Patent.  Patented Jan. 18, 1921.

Application filed December 16, 1918. Serial No. 266,875.

*To all whom it may concern:*

Be it known that I, JAMES B. REPLOGLE, a citizen of the United States of America, residing at Detroit, county of Wayne, State of Michigan, have invented certain new and useful Improvements in Speed-Limiting Devices, of which the following is a full, clear, and exact description.

This invention relates to speed limiting devices for automotive vehicles, and particularly to vehicles propelled by internal combustion engines and having change speed gearing between the engine and the driving wheel of the vehicle.

The principal object of this invention is to provide speed limiting means having provisions which are controlled automatically in accordance with the position of the change speed gear lever whereby the speed of the engine will be limited to an amount which is best suited to the gearing connection between the engine and the wheels of the vehicle, and which will limit the engine to the proper speed for idling.

More particularly it is the aim of the invention to provide a speed limiting device which will prevent racing of the engine when idle but which will permit the raising of the speed limit of the engine especially when the change speed gear lever is thrown into reverse or low speed positions in order that, for example, the vehicle may be quickly started from rest and with sufficient power to pull itself out of a tight place, such as a mud hole, steep hill, traffic congestion and the like.

While the speed limit of the engine is controlled automatically variations in speed below the limit are provided by manually controlling a throttle valve.

Other and further objects of the present invention will be apparent from the following description, reference being had to the accompanying drawing, wherein preferred embodiments of the present invention are clearly shown.

Referring to the drawings:

Fig. 3 is a side elevation of an engine and transmission gear case to which the present invention is applied; said case being partly in section; and Fig. 4 is a plan view of the transmission gear case shown in Fig. 3, together with a wiring diagram.

Figure 1:
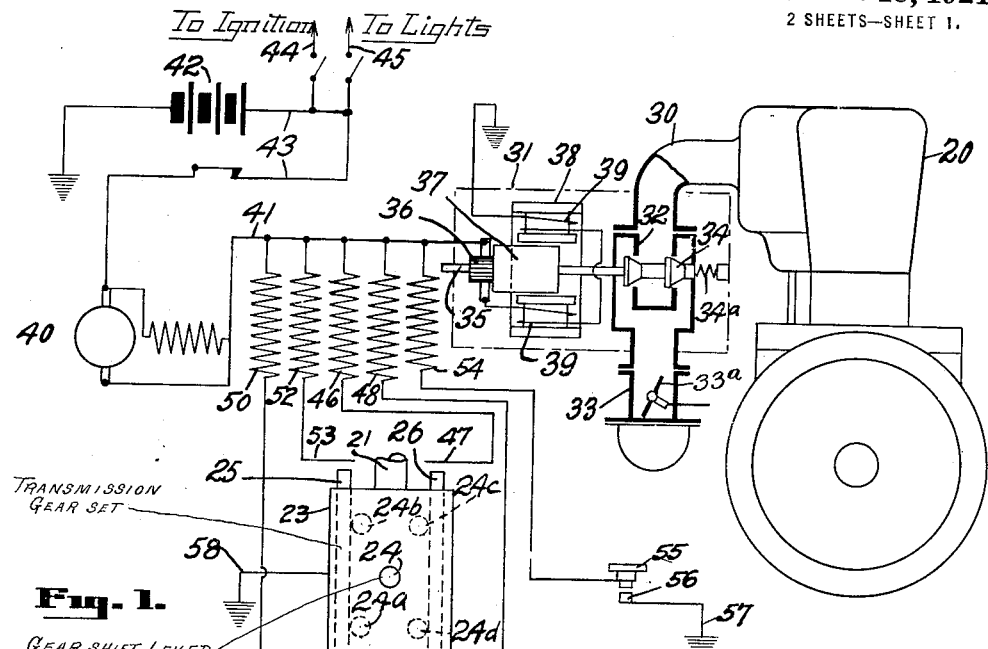
Figure 1 is a wiring diagram showing diagrammatically in connection therewith an engine provided with speed limiting means included in the present invention.

Referring to Fig. 1, 20 indicates an internal combustion engine which is connected by suitable clutch devices, not shown, with a transmission shaft 21 which in turn is connected by suitable gearing, not shown, with a propeller shaft 22. The gearing connecting these shafts is included in a gear case 23, and said gears are shifted in a well known manner by means of the gear shifting lever 24. The usual gear shifting rods 25 and 26 are slidably mounted upon the gear casing 23. These rods are arranged so as to be selected by and to be moved forward and backward by means of the lever 24. The connection between said lever 24 and rod 26 is such that when lever 24 is moved into position $24^a$, generally known as the low gear position, the rod 26 will move upwardly as viewed in Fig. 1; and, when the lever 24 is moved into position $24^b$, generally known as the reverse gear position, the rod 26 will move downwardly as viewed in Fig. 1. The action between the lever 24 and the rod 25 is such that when the lever 24 is moved into position $24^c$, generally known as the intermediate speed position, the rod 25 will be moved downwardly as viewed in Fig. 1; and, when the lever 24 is moved to the position $24^d$, generally known as high speed position, the rod 25 will be moved upwardly as viewed in Fig. 1. In order that the operation of the gear shifting lever 24 may be clearly understood, reference is made to Figs. 3 and 4. The shaft 21 provides a bearing for the reduced end portion $22^b$ of shaft 22 having a squared portion $22^a$. Shaft 21 is provided with gear 80 adapted to engage with gear 91 on shaft 90 and also adapted to clutch with an internal gear 81 provided in a gear 82 slidably mounted on shaft portion $22^a$ and having a grooved collar 83. Gear 84 having a grooved collar 85 is also slidably mounted on shaft portion $22^a$. Gear 84 is arranged to engage with idler gear 95 which meshes with gear 94 carried by shaft 90, or to engage with gear 93 carried by shaft 90. Gear 82 is arranged also to engage gear 92 carried by shaft 90. Rod 25 carries a block $25^a$ having a fork $25^b$ engaging grooved collar 83, and provided with a notch 25ᶜ. Rod 26 carries a block 26ᵃ having a fork 26ᵇ engaging grooved collar 85, and provided with a notch 26ᶜ. Lever 24 is universally pivoted at 24ᵉ and terminates at its lower end in a ball 24ᶠ which is adapted to enter either of the notches 25ᶜ or 26ᶜ, which, in neutral position of the gear shift lever 24 (as shown in Figs. 3 and 4), are oppositely disposed.

To shift the gearing from neutral into low gear position, the upper ball end of lever 24 is moved in the direction of arrows 124ᵃ into the position represented by the dot-and-dash circle 24ᵃ. Notch 26ᶜ will first be engaged by ball 24ᶠ and rod 26 will then be moved to the right, as viewed in Figs. 3 and 4, carrying gear 84 into engagement with gear 93. Shafts 21 and 22 will then be connected by gearing 80, 91, 93 and 84. This movement of rod 26 corresponds to the upward movement thereof as viewed in Fig. 1.

To shift the gearing from neutral into reverse gear position, the upper ball end of lever 24 is moved in the direction of arrows 124ᵇ into the position represented by the dot-and-dash circle 24ᵇ. Notch 26ᶜ will first be engaged by ball 24ᶠ and rod 26 will then be moved to the left, as viewed in Figs. 3 and 4, carrying gear 84 into engagement with idler gear 95. Shafts 21 and 22 will then be connected by gearing 80, 91, 94, 95 and 84. This movement of rod 26 corresponds to the downward movement thereof as viewed in Fig. 1.

To shift the gearing from neutral into intermediate gear position, the upper ball end of lever 24 is moved in the direction of arrows 124ᶜ into the position represented by the dot-and-dash circle 24ᶜ. Notch 25ᶜ will first be engaged by ball 24ᶠ and rod 25 will then be moved to the left, as viewed in Figs. 3 and 4, carrying gear 82 into engagement with gear 92. Shafts 21 and 22 will then be connected by gearing 80, 91, 92 and 82. This movement of rod 25 corresponds to the downward movement thereof as viewed in Fig. 1.

To shift the gearing from neutral into high gear position, the upper ball end of lever 24 is moved in the direction of arrows 124ᵈ into the position represented by the dot-and-dash circle 24ᵈ. Notch 25ᶜ will first be engaged by ball 24ᶠ and rod 25 will then be moved to the right, as viewed in Figs. 3 and 4, carrying gear 81 into telescopic engagement with gear 80, thereby connecting shafts 21 and 22 directly together. This movement of rod 25 corresponds to the upward movement thereof as viewed in Fig. 1.

The engine 20 is provided with an intake 30 which is connected with an automatic throttle valve designated as a whole by 31. The valve 31 comprises a valve port member 32 which is connected with the intake 30 and a carbureter 33 having a manually operated throttle 33ᵃ. A balanced valve 34 coöperates with the member 32 and is mounted for rotation upon an armature shaft 35, which carries a commutator 36 and an armature 37. Said armature 37 coöperates with a motor field 38 provided with a series winding 39. The motor windings of the automatic valve 31 are connected to a generator 40 by means of a wire 41, and said generator is connected to a battery 42, by means of a wire 43. The conductors 44 and 45 communicating with the ignition apparatus and lamps are tapped into the conductor 43. Generator 40 operates to charge the battery 42 and to furnish current for lights and ignition as well as for the electrical governor.

Resistance elements 46, 48, 50, 52 and 54 are connected with the wire 41 and with switch contact members 47, 49, 51, 53 and 55 respectively. The switch contacts 47 and 49 are arranged to be engaged by the ends of rod 26, while the contact members 51 and 53 are arranged to be engaged by the rod 25. The contact 55 may be moved manually into engagement with the contact 56 which is grounded at 57. The electrical connection made with the rods 25 and 26 is completed by the ground connection 58, which is generally the frame of the vehicle upon which the change speed gear case 23 is mounted.

The operation of this form of the invention is as follows: When the voltage of the generator 40 driven by the engine 20 exceeds a certain amount, sufficient current will have passed through the armature 37 and the field windings 39 to cause the armature to tend to assume a symmetrical relation to the field 38 and to effect the closing of the balanced valve 34. In this manner the throttling of the fuel will be effected and the engine will tend to slow down. The voltage of the generator 40 will then be decreased and the spring 34ᵃ will be effective to overcome the magnetic attraction exerted by the field 38 upon the armature 37 and to cause the valve 34 to move to the left as viewed in Fig. 1. A balance will finally be established between the force tending to move the valve 34 to closed position and the force exerted by the spring 34ᵃ. Thus the speed of the engine will be limited. The field 38 not only causes the attraction of the armature 37 but also the rotation thereof. This rotation provides for taking up mechanical friction whereby to cause the automatic valve to be quickly responsive to slight changes in electromotive force impressed upon it. It is not known at present that speed of rotation of armature 37 has any effect on its governing action. However it is known that by keeping the shaft 35 and valve 34 in a state of rotation during the governing or speed limiting operation, the longitudinal shifting movement of these parts takes place as if no friction were present.

The particular construction and operation of this automatic valve, however, is not a part of the present invention but is described and claimed in my copending application Serial No. 262,010, filed November 11, 1918.

Now if the vehicle should be in a difficult position such as in a mud hole, where considerable engine speed and pulling force are necessary in order to increase the torque at the rear axle, the change speed lever 24 may be shifted into low gear position 24$^a$, or into the reverse position 24$^b$ if desired. With the lever 24 in either of these positions, the rod 26 will contact with either of the switch contacts 47 or 49 and thereby cause part of the current delivered by the generator to be diverted either through the resistance 46 or through the resistance 48 respectively. When this occurs it will be necessary for the engine to attain a greater speed in order that the automatic valve 31 will begin to throttle. In this manner the maximum governed speed of the engine is raised when the change speed lever is moved to low gear or reverse positions.

When the lever 24 is shifted to the intermediate gear position 24$^c$, the rod 25 will be moved into contact with the switch contact 51 thereby diverting a part of the current generated through the resistance 50. The resistance 50 may have a higher value than either of the resistances 46 or 48 whereby less current will be diverted from the motor throttle governor 31 when the change speed lever is in the position 24$^c$ than when said lever is in either of the positions 24$^a$ or 24$^b$. Hence it follows that for a given engine speed, more current will be delivered to the motor throttle governor 31. Therefore the maximum engine speed for the intermediate gear position will be lower than for the low speed or reverse speed connections.

When the change speed lever 24 is shifted to high speed position 24$^d$, the rod 25 will be moved upwardly into engagement with the switch contact member 53, thereby causing a part of the current generated to be diverted through the resistance 52. This resistance 52 may, if desired, be made of a value still greater than any of the resistances described, whereby the maximum governed speed of the engine will be still further reduced when the engine is connected in high gear with the wheels of the vehicle.

It is apparent that by changing the resistances 46, 48, 50 and 52 the limit of governed speed of the engine can be adjusted so as to have a value which is best suited to the particular speed ratio between the engine and the wheels of the vehicle. If desired some of these resistances and their connections with the rods 25 or 26 could be omitted, or these resistances could all be made equal instead of varying in value.

Where it is desirable, manual means can be provided for raising the governed speed limit of the engine. It will be seen by referring to Fig. 1 by moving contact 55 into engagement with contact 56 a part of the current generated will be diverted through the resistance 54 with an effect upon the automatic valve 31 similar to that just described. It will be apparent that resistance 54 could be made equal to or greater or less than any of the resistances 46, 48, 50 and 52 in order to vary the governed speed of the engine the required amount.

Figure 2:
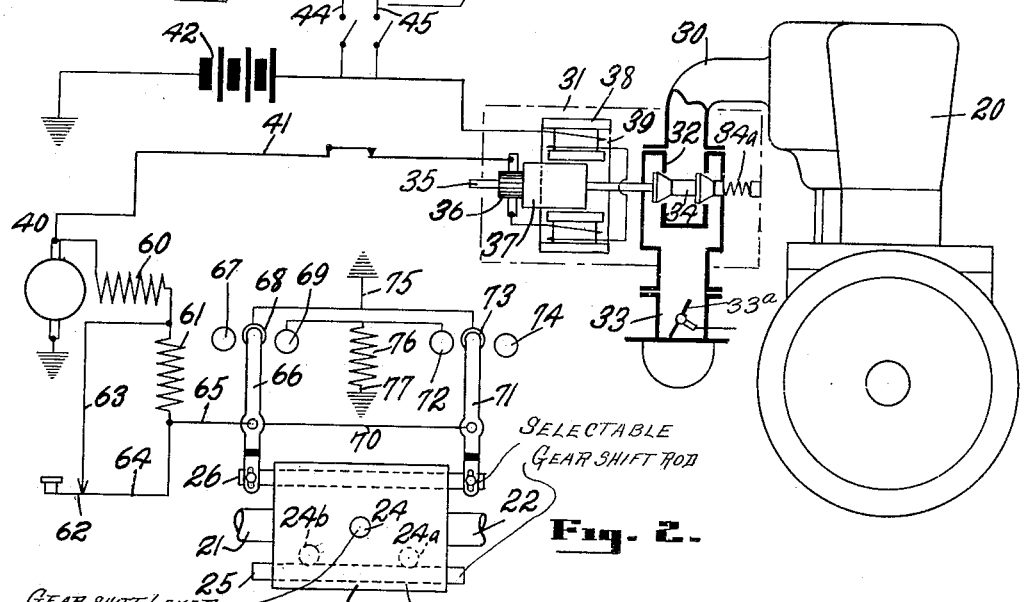
Fig. 2 is a wiring diagram showing a modified form of the invention.

Another manner of varying the limit of governed speed of the engine by shifting the change speed lever into certain positions is shown in Fig. 2. The generator 40 is provided with a shunt field winding 60 connected with a resistance 61, but which is normally short circuited by a switch 62 connected with wires 63 and 64. The resistance 61 is connected by means of wire 65 with a switch element 66 which coöperates with buttons 67, 68 and 69. Wire 70 connects switch element 66 with a switch element 71. which coöperates with contacts 72, 73 and 74. Contacts 68 and 73 are grounded at 75. Contacts 69 and 72 are connected to a resistance 76 which is grounded at 77. Contacts 67 and 74 do not form any electrical connection.

The switch elements 66 and 71 are connected by means of pin slot connections with the rod 26. During normal operation of the vehicle the rod 26 and the members 66 and 71 are in the position shown in Fig. 2. The shunt field circuit will be established by means of wires 63, 64, 65, switch contact 66, wire 70, contact 71, switch contacts 68 and 73 and ground connection 75.

If the change speed lever 24 be shifted to the low gear position 24$^a$ the rod 26 will be moved to the left as viewed in Fig. 2. When this occurs the switch contact 71 will coöperate with the contact 74 but the contact 66 will coöperate with the contact 69, thereby cutting in the resistance 76 in series with the shunt field winding 60. This operation decreases the field excitation and therefore the output of the generator. Thus it will be necessary for the engine 20 to attain a higher speed in order that the output of the generator will be sufficient to cause the automatic valve 31 to throttle the engine.

The same result will be accomplished by shifting the change speed lever 24 to the reverse position 24$^b$. When the lever is in this position the rod 26 will move to the right as viewed in Fig. 2. Switch contact 66 will coöperate with contact 67, and switch contact 71 with contact 72. In this manner the resistance 76 will again be connected in series with the shunt field winding 60, thereby reducing the excitation in the generator 40.

If desired, manual means can be provided for effecting the same result as effected automatically by the moving of the change speed lever to the position described. By opening the switch 62 the short circuit 63, 64 around the resistance element 61 will be broken, thereby reducing the field excitation of the generator 40.

If desired, the switch contacts 69 and 72 could be connected with grounded resistances having different values in order that the maximum engine speed would be different for reverse gear connection than for low speed gear connection. It is apparent that the lever 25 could also be arranged to operate switch levers corresponding with switch levers 66 and 71 so that when the change speed gear lever 24 is shifted to intermediate or high speed gear positions, resistances equal or different in value would be inserted in the generator field circuit whereby to raise the limit of governed speed of the engine in the manner described.

While the particular form of electrical throttle governor is a preferred form, it is to be understood that other forms of electromagnetic throttle governors may be used in the electrical system described.

While the forms of mechanisms herein shown and described constitute preferred forms of embodiment of the invention, it is to be understood that other forms might be adopted, all coming within the scope of the claims which follow.

I claim—

1. In a speed limiting device for power plants of self-propelled vehicles provided with change speed gearing having a gear selecting lever, the combination with an engine and means acting automatically in accordance with the operation of the engine for limiting the speed of the engine; of means operated automatically upon the shifting of said lever to certain positions to vary the limit of governed speed of the engine.

2. In a speed limiting device for power plants of self-propelled vehicles provided with change speed gearing having a gear selecting lever, the combination with an engine and means acting automatically in accordance with the operation of the engine for limiting the speed of the engine; of means operated automatically upon the shifting of said lever to certain positions to vary the limit of governed speed of the engine; and manual means for varying the limit of governed speed of the engine.

3. In a speed limiting device for power plants of self-propelled vehicles provided with change speed gearing having a gear selecting lever, the combination with an engine and a generator driven thereby; of an electric speed limiting device acting automatically in accordance with the output of the generator to limit the speed of the engine; and means operable automatically upon the moving of said lever to certain positions to vary the limit of governed speed of the engine.

4. In a speed limiting device for power plants of self-propelled vehicles provided with change speed gearing having a gear selecting lever, the combination with an engine and a generator driven thereby; of an electric speed limiting device acting automatically in accordance with the output of the generator to limit the speed of the engine; means operable automatically upon the moving of said lever to certain positions to vary the limit of governed speed of the engine; and manual means for varying the limit of governed speed of the engine.

5. In a speed limiting device for power plants of self-propelled vehicles provided with change speed gearing having a gear selecting lever, the combination with an engine and a generator driven thereby; of means controlled electrically by the amount of current delivered by the generator thereto for limiting the speed of the engine;. and means operable automatically by the shifting of said lever to certain positions to vary the amount of current delivered by the generator to the speed limiting means at a given engine speed, whereby the limit of governed speed of the engine may be varied.

6. In a speed limiting device for power plants of self-propelled vehicles provided with change speed gearing having a gear selecting lever, the combination with an engine and a generator driven thereby; of means controlled electrically by the amount of current delivered by the generator thereto for limiting the speed of the engine; means operable automatically by the shifting of said lever to certain positions to vary the amount of current delivered by the generator to the speed limiting means at a given engine speed, whereby the limit of governed speed of the engine may be varied; and manual means for varying the amount of current delivered by the generator to the speed limiting means whereby to vary the governed speed of the engine.

7. In a speed limiting device for power plants of self-propelled vehicles, the combination with an engine and a generator driven thereby; of an electric speed limiting device acting automatically in accordance with the output of the generator to limit the speed of the engine; and manual means for varying the delivery of current to the speed limiting device whereby to vary the limit of governed speed of the engine.

8. In a speed limiting device for power plants of self-propelled vehicles provided with change speed gearing, the combination with an engine and means acting automatically in accordance with the operation of the engine for limiting the speed of the engine; of means depending on the arrangement of the change speed gearing for regulating the limit of governed speed of the engine to predetermined values best suited for the arrangement of change speed gears.

9. In a speed limiting device for power plants of self-propelled vehicles provided with change speed gearing, the combination with an engine; of means for limiting the speed of the engine; and means for selecting said change speed gearing and for controlling said speed limiting means.

10. In a speed limiting device for power plants of self-propelled vehicles provided with change speed gearing, the combination with an engine; electrical governing means for the engine; and means for selecting said change speed gearing and for controlling said electrical governing means.

11. In a speed limiting device for power plants of self-propelled vehicles provided with change speed gearing, the combination with an engine and a generator driven thereby; of electrical governing means for the engine operated by said generator; and means for selecting said change speed gearing and for controlling the current delivered by the generator to the governing means.

12. In a speed limiting device for power plants of self-propelled vehicles, the combination with an engine and a generator driven thereby; of an electro-responsive engine governor connected with said generator; and means for placing a resistance in shunt with said governor.

13. In a speed limiting device for power plants of self-propelled vehicles provided with change speed gearing, the combination with an engine and a generator driven thereby; of an electro-responsive engine governor connected with said generator; and means for placing a resistance in shunt with said governor and for selecting said gearing.

14. In a speed limiting device for power plants of self-propelled vehicles, the combination with an engine and a generator driven thereby; of a storage battery charged by the generator; an electro-responsive engine governor connected in series with said generator and battery; and means for placing a resistance in shunt with said governor.

15. In a speed limiting device for power plants of self-propelled vehicles provided with change speed gearing, the combination with an engine and a generator driven thereby; of a storage battery charged by the generator; an electro-responsive engine governor connected in series with said generator and battery; and means for placing a resistance in shunt with said governor and for selecting said gearing.

In testimony whereof I affix my signature.

JAMES B. REPLOGLE.

Witnesses:
L. L. HOSIER,
C. M. JESSUP.